(12) United States Patent
Vaello Paños et al.

(10) Patent No.: US 11,391,843 B2
(45) Date of Patent: Jul. 19, 2022

(54) USING TIME-OF-FLIGHT TECHNIQUES FOR STEREOSCOPIC IMAGE PROCESSING

(71) Applicant: ams International AG, Rapperswil (CH)

(72) Inventors: Miguel Bruno Vaello Paños, Eindhoven (NL); David Stoppa, Eindhoven (NL); Markus Rossi, Eindhoven (NL); Kang Seok Joo, Eindhoven (NL)

(73) Assignee: ams International AG, Rapperswil (CH)

( * ) Notice: Subject to any disclaimer, the term of this patent is extended or adjusted under 35 U.S.C. 154(b) by 66 days.

(21) Appl. No.: 17/055,533

(22) PCT Filed: May 14, 2019

(86) PCT No.: PCT/EP2019/062353
§ 371 (c)(1),
(2) Date: Nov. 13, 2020

(87) PCT Pub. No.: WO2019/219687
PCT Pub. Date: Nov. 21, 2019

(65) Prior Publication Data
US 2021/0215827 A1 Jul. 15, 2021

Related U.S. Application Data

(60) Provisional application No. 62/671,175, filed on May 14, 2018.

(51) Int. Cl.
*G01S 17/89* (2020.01)
*H04N 13/271* (2018.01)
(Continued)

(52) U.S. Cl.
CPC ............ *G01S 17/89* (2013.01); *G01S 17/86* (2020.01); *G01S 17/894* (2020.01); *H04N 13/239* (2018.05); *H04N 13/271* (2018.05)

(58) Field of Classification Search
CPC .......... G01S 17/86; G01S 17/87; G01S 17/89; G01S 17/894; H04N 13/239; H04N 13/271
See application file for complete search history.

(56) References Cited

U.S. PATENT DOCUMENTS

2012/0050495 A1  3/2012 Chen et al.

FOREIGN PATENT DOCUMENTS

EP  2890125 A1  7/2015

OTHER PUBLICATIONS

Young Min Kim et al: 11 Multi-view image and ToF sensor fusion for dense 3D reconstruction 11 ,2009 IEEE 12th International Conference on Computer Vision Workshops, CCV Workshops . Kyoto, Japan, Sep. 27-Oct. 4, 2009, Institute of Elect ri cal and Electronics Engineers, Piscataway, NJ, Sep. 27, 2009 (Sep. 27, 2009). pp. 1542-1549, XP031664460, ISBN: 978-1-4244-4442-7.

(Continued)

*Primary Examiner* — Farzana Hossain
(74) *Attorney, Agent, or Firm* — Viering, Jentschura & Partner MBB

(57) ABSTRACT

The current disclosure describes a stereo imaging system that is configured to use Time-of-Flight ("Tof") techniques to aid in stereoscopic image processing. One process disclosed uses ToF to aid in identifying the same elements (e.g., pixel clusters) in stereo image pairs by narrowing down search areas for matching. Another process uses ToF to aid in identifying the same elements in stereo image pairs where there a small amount texture making it difficult to find a match.

20 Claims, 10 Drawing Sheets

(51) Int. Cl.
*H04N 13/239* (2018.01)
*G01S 17/86* (2020.01)
*G01S 17/894* (2020.01)

(56) References Cited

OTHER PUBLICATIONS

PCT/EP2019/062353 International Search Report and Written Opinion, dated Jul. 19, 2019, 11 pages.

200

202

Determine, using the echoes of signals from the ToF sensor, a plurality of estimated distances for a plurality of portions of the scene;

204

Select a first cluster of pixels from the first image

206

Identify, in the plurality of estimated distances, an estimated distance corresponding to the first cluster of pixels

208

Calculate, based on the estimated distance corresponding to the first cluster of pixels, a shift distance between the first cluster of pixels in the first image and a corresponding cluster of pixels in the second image

210

Locate, within the second image, the corresponding cluster of pixels based on the shift distance

FIG. 2

USING TIME-OF-FLIGHT TECHNIQUES FOR STEREOSCOPIC IMAGE PROCESSING

CROSS-REFERENCE TO RELATED APPLICATIONS

This application is a 371 U.S. National Phase of PCT International Patent Application No. PCT/EP2019/062353, filed on May 14, 2019, which claims benefit and priority to U.S. provisional patent application No. 62/671,175, filed on May 14, 2018; the disclosures of which are each incorporated by reference herein in their entirety.

FIELD OF THE DISCLOSURE

This disclosure relates to image processing, and in particular using time-of-flight techniques for stereoscopic image processing.

BACKGROUND

An image can be considered a projection from a three-dimensional (3D) scene onto a two-dimensional (2D) plane. Although a 2D image does not provide depth information, if two images of the same scene are available from different vantage points, the position (including the depth) of a 3D point can be found using known techniques.

A stereoscopic image (that includes two images from two vantage points) enables an observer to perceive depth by combining two offset images (usually from two cameras mounted side-by-side) of the same scene. Some stereoscopic methods present the two offset images separately to the left eye and the right eye. The observer's brain then combines the image from the right eye and the image from the left eye to give perception that the observer is looking at a three-dimensional image.

Various techniques have been developed to obtain information from a stereoscopic image. For example, stereo matching is a process in which two images (a stereo image pair) of a scene taken from slightly different vantage points are matched to find disparities (differences in position) of image elements which depict the same scene element. The disparities provide information about the relative distance of the scene elements from the camera. A stereo camera including, for example, two image capture devices separated from one another by a known distance, which may be referred to as the baseline distance, can be used to capture the stereo image pair.

Stereoscopic imaging has many applications in the field of computer vision. One important application involves distance identification for various surfaces/objects in an image. Distance identification can be useful in many industries such as robotics, autonomous vehicle building, virtual reality applications, and others. Various challenges exist in this field of stereoscopic imaging. For example, identifying the same surface in the two offset images can be a very resource and time consuming process. In some instances, it may be even more difficult in situations where there is not much texture in the two images to differentiate different surfaces. For example, if the background of a specific image includes a white wall, presently-available algorithms may not be able to match the specific parts of the images.

SUMMARY

The current disclosure describes a stereo imaging system that, in some instances, addresses at least some of the problems mentioned above. The stereo imaging system is configured to use Time-of-Flight ("ToF") techniques to aid in stereoscopic image processing (e.g., in depth map generation and/or disparity map generation). One process described in this disclosure uses ToF to aid in identifying the same elements (e.g., pixel clusters) in stereo image pairs. In some implementations, a stereo imaging system may include a first lens coupled to a first imaging sensor and a second lens coupled to a second imaging sensor. Each lens is operable to capture an image from a different point of view. That is, the first lens/sensor combination captures the scene from a first point of view and the second lens/sensor combination captures the scene from a second point of view. The two lens/sensor combinations may be positioned parallel to each other to form a stereoscopic camera. The stereo imaging system also includes a time-of-flight ("ToF") sensor that can be used to measure estimated distances to objects in a scene. The ToF sensor may also be part of the same apparatus (e.g., a stereoscopic camera).

In some implementations, the stereo imaging system determines, using the echoes of signals from the ToF sensor, estimated distances for a plurality of portions of the scene. For example, the stereo imaging system may receive data from the ToF sensor and determine based on the data that certain objects are located in the scene and the estimated distance for each of the objects.

The stereo imaging system select a first cluster of pixels from the first image. For example, the stereo imaging system can use techniques such as edge detection to select a cluster of pixels (e.g., pixels of the same or substantially the same color located next to each other). In some implementations, the imaging system selects a pixel. And the calculation of the shift distance are performed based on the selected pixel.

The stereo imaging system then identifies, in the plurality of estimated distances, an estimated distance corresponding to the first cluster of pixels. For example, the stereo imaging system may map locations of the estimated distances calculated based on ToF onto the first image. In some implementations, the stereo imaging system maps the estimated distances as follows. The stereo imaging system receives, from the ToF sensor, data corresponding to a plurality of echoes resulting from one or more light emissions from the light source, wherein the light emissions are reflected by one or more objects within the scene and location data of the plurality of echoes. The stereo imaging system determines based on the data, the estimated distances and a location of each estimated distance. For example, the stereo imaging system stores a map of the captured data, the map includes coordinates and distances for various parts of the scene. The stereo imaging system maps the estimated distances to coordinates within the first image, and stores, in the memory, a data structure including the estimated distances with corresponding coordinates. For example, the each point (e.g., set of coordinates) within the ToF map can be mapped onto a coordinates on the first image. That is, a specific horizontal and vertical coordinate calculated from the upper left-hand corner of the ToF sensor may be mapped to a specific coordinate on the first image.

In some implementations, the ToF sensor has a smaller resolution than the image sensors coupled with the lenses. In those implementations, multiple coordinates within the first image are mapped to one coordinate of the ToF sensor (e.g., ToF sensor point).

There stereo imaging system calculates, based on the estimated distance corresponding to the first cluster of pixels, a shift distance between the first cluster of pixels in the first image and a corresponding cluster of pixels in the second image. For example, the stereo imaging system can use a focal length, the base distance (between the lenses) and the estimated distance to calculate the shift distance. That is, the stereo imaging system may retrieving a focal length of the first lens (e.g., from the metadata of the image), and a distance between a center of the first lens and a center of the second lens (e.g., from the camera itself or from the metadata of the image. The stereo imaging system retrieves a mathematical formula to calculate the shift distance based on the focal length of the first lens, the distance between the center of the first lens and the center of the second lens, and the estimated distance. In some implementations, the stereo imaging system performs this calculation for a specific pixel or point on the first image.

When the shift distance is determined, the stereo imaging system locates, within the second image, the corresponding cluster of pixels based on the shift distance. For example, if the calculation determines that the cluster of pixels is shifted by ten pixels, the stereo imaging system, calculates the position on the second image corresponding to the offset of ten pixels and searching the area around the offset for the matching cluster of pixels.

In some implementations the stereo imaging system identifies, in the estimated distances, the estimated distance corresponding to the first cluster of pixels by performing the following actions. The stereo imaging system retrieves a set of coordinates within the first image, the set of coordinates corresponding to the first cluster of pixels. For example, the stereo imaging system may retrieve coordinates of a pixel within the cluster of pixels. In some implementations, the stereo imaging system retrieves coordinates of multiple pixels. The stereo imaging system identifies, a distance corresponding to the set of coordinates by retrieving (e.g., from a data structure or a database) an estimated distance corresponding to the set of coordinates. In implementations, where multiple pixels are used, the stereo imaging system retrieves and estimated distance for each pixel. The estimated distances for the pixels should be the same or close in value.

In some implementations, the stereo imaging system locate, within the second image, the corresponding cluster of pixels based on the shift distance by performing the following actions. The stereo imaging system retrieves a size associated with the first cluster of pixels. For example, the cluster of pixels may be fifty pixels by twenty pixels. The stereo imaging system generating, for the second image, a search area based on the size of the first cluster of pixels and the shift distance. For example, the stereo imaging system may generate a search area of a size that is bigger than fifty pixels by twenty pixels (e.g., two thousand pixels). There stereo imaging system identifies, in the second image, a second cluster of pixels corresponding to the first cluster of pixels. For example, the stereo imaging system may search the identified area for that cluster.

In some implementations, the stereo imaging system generates a depth map or a disparity map based on the matched clusters of pixels. To generate the depth map, the stereo imaging system repeats the matching process for every cluster of pixels in the first image.

In some implementations, the stereo imaging system includes a first camera coupled to a first ToF sensor. The first camera is operable to capture a first image. The stereo imaging system may include a second camera coupled to a second ToF sensor. The second camera may be operable to capture a second image. For example, the stereo imaging system may include a left camera and a right camera for capturing stereoscopic image pairs. Each camera may include a ToF sensor. The stereo imaging system may also include control circuitry coupled to the first camera and the second camera.

In some implementations, in addition to capturing a stereoscopic image (e.g., a left image and a right image), the stereo imaging system collects distance measurements for both images. That is, the stereo imaging system determines, using signals from the first ToF sensor, a first set of estimated distances for portions of the first image, and using signals from the second ToF sensor, a second set of estimated distances for portions of the second image.

In some implementations, the stereo imaging system detects the estimated distances as described below. The stereo imaging system may include a light source and a memory. A respective ToF sensor coupled to each camera (e.g., a first ToF sensor and a second ToF sensor) are configured for estimating distance measurements. Because these ToF sensors may not have as high of resolution as the ToF sensors used to capture the left and right images themselves, estimated distances for various portions of the left and right images are captured. Thus, the stereo imaging system divides the first image (and in some implementations the second image) into the multiple portions. These portions may correspond to a number of pixels that the ToF sensor can receive data for.

The stereo imaging system may use direct ToF techniques or indirect ToF techniques to determine estimated distances. With direct ToF, the stereo imaging system receives, with the first ToF sensor, a first set of echoes resulting from one or more light emissions from the light source. The light emissions are reflected by one or more objects (or parts of objects) within the multiple portions of the first image. The stereo imaging system determines, based on the set of echoes, the first set of estimated distances for the portions of the first image, and stores the first set of estimated distances in the memory. For example, an image may include a table that has parts close to the camera and also further away from the camera. The stereo imaging system may using ToF techniques to determine an estimated distance of certain parts of the table in the image.

The stereo imaging system continues with the process and identifies corresponding pixel clusters in the two images of the stereoscopic image. The stereo imaging system selects a first cluster of pixels from the first image. For example, the stereo imaging system can use techniques such as edge detection to select a cluster of pixels (e.g., pixels of the same or substantially the same color located next to each other).

When the cluster of pixels is selected, the stereo imaging system identifies, in the first set of estimated distances, an estimated distance corresponding to the first cluster of pixels. For example, the stereo imaging system may access a data structure that stores estimated distances and retrieve the estimated distance corresponding to the cluster of pixels. The stereo imaging system uses the identified estimated distance to identify parts of the second image that are approximately the same distance away from the second camera. That is, the stereo imaging system identifies, based on the second set of estimated distances, a subset of portions of the second image corresponding the identified estimated distance.

When the portions of the second image are identified with substantially the same estimated distances as the estimated distance of the selected cluster of pixels, the stereo imaging system needs to try matching the selected pixel cluster to pixels located in those portions, without having to try matching the pixels cluster of the whole image. That is the stereo imaging system identifies, within the subset, a second cluster of pixels from the second image that matches the first cluster of pixels from the first image. For example, if the cluster of pixels is located at a specific estimated distance from the camera, only pixel clusters in the second image that are located at a substantially the same estimated distance are compared when matching pixel clusters.

In some implementations, the stereo imaging system identifies a subset of portions of the second image corresponding the identified estimated distance by iterating through estimated distances of the second image to find the appropriate parts. That is the stereo imaging system retrieves the estimated distance corresponding to the first cluster of pixels and compares the estimated distance corresponding to the first cluster of pixels with the estimated distances in the second set of estimated distances. Based on the comparison, the stereo imaging system identifies one or more estimated distances in the second set of estimated distances that match the estimated distance corresponding to the first cluster of pixels, and retrieves one or more portions associated with the one or more estimated distances. For example, the second image may include fifty estimated distances for various portions. The stereo imaging system may compare each estimated distance with the estimated distance of the selected cluster of pixels and select only the matching estimated distances for further processing (i.e., for pixel comparison).

In some implementations, the stereo imaging system calculates, based on a location of the first cluster of pixels in the first image and a location of the second cluster of pixels in the second image, a distance to a surface represented by the first cluster and the second cluster. For example, the stereo imaging system may use a disparity value between the two pixel clusters together with focal length, baseline, and pixel size to calculate the distance to surface (i.e., depth of the object).

In some implementations, the stereo imaging system stores the identified pixel clusters and their estimated distances in a data structure. That is, the stereo imaging system stores, in a data structure, the distance and an identifier associated with the cluster of pixels from the first image, where the data structure maps distances to portions of a particular image. In some implementations, the stereo imaging system stores depth and/or distance maps. That is, the stereo imaging system identifies a set of clusters of pixels within the first image, stores, in the data structure, a set of distances and corresponding identifiers associated with the set of distances, and generates a depth map based on data in the data structure.

In some implementations, a stereo imaging system uses ToF to aid in pixel cluster matching between two images when there is very little texture to the two images. Lack of texture in images creates a problem where some imaging systems are unable to match pixel clusters in the areas where clusters look the same. In some implementations, a stereo imaging system includes a first camera coupled to a first ToF sensor and operable to capture a first image, and a second camera coupled to a second ToF sensor operable to capture a second image. For example, the stereo imaging system may include a left camera and a right camera for capturing stereoscopic image pairs. Each camera may include a ToF sensor. The stereo imaging system may also include control circuitry coupled to the first camera and the second camera.

In some implementations, in addition to capturing a stereoscopic image (e.g., a left image and a right image), the stereo imaging system collects distance measurements for both images. That is, the stereo imaging system determines, using signals from the first ToF sensor, a first set of estimated distances for portions of the first image, and using signals from the second ToF sensor, a second set of estimated distances for portions of the second image.

In some implementations, the stereo imaging system detects the estimated distances as described below. The stereo imaging system may include a light source and a memory. A respective ToF sensor coupled with each camera (e.g., a first ToF sensor and a second ToF sensor) are configured for estimating distance measurements. Because these ToF sensors may not have as high of resolution as the ToF sensors used to capture the left and right images themselves, estimated distances for various portions of the left and right images are captured. Thus, the stereo imaging system divides the first image (and in some implementations the second image) into portions. These portions may correspond to a number of pixels for which the ToF sensor can receive data.

The stereo imaging system may use direct ToF techniques or indirect ToF techniques to determine estimated distances. With direct ToF, the stereo imaging system receives, with the first ToF sensor, a first set of echoes resulting from one or more light emissions from the light source. The light emissions are reflected by one or more objects (or parts of objects) within the portions of the first image. The stereo imaging system determines, based on the set of echoes, the first set of estimated distances for the portions of the first image, and stores the first set of estimated distances in the memory. For example, an image may include a table that has parts close to the camera and also further away from the camera. The stereo imaging system may using ToF techniques to determine an estimated distance of certain parts of the table in the image.

The stereo imaging system continues with the process and identifies corresponding pixel clusters in the two images of the stereoscopic image. The stereo imaging system selects a first cluster of pixels from the first image. For example, the stereo imaging system can use techniques such as edge detection to select a cluster of pixels (e.g., pixels of the same or substantially the same color located next to each other).

The stereo imaging system then searches, in the second image, for pixels that match the selected first cluster of pixels. For example, the stereo imaging system may perform shape and color matching to identify a matching cluster of pixels in the second image. In some instances, the stereo imaging system determines, based on the search, that the first cluster of pixels matches multiple clusters of pixels in the second image. For example, if an image includes a person in front of a white wall, the stereo imaging system may identify various pixel clusters on the white wall in the second image that match a selected cluster of pixels in the first image.

In response to determining that the first cluster of pixels matches multiple clusters of pixels in the second image, the stereo imaging system performs the following actions. The stereo imaging system selects, from the first set of estimated distances, an estimated distance corresponding to the first cluster of pixels. For example, the stereo imaging system may access a data structure that stores estimated distances and retrieve the estimated distance corresponding to the cluster of pixels. The stereo imaging system uses the identified estimated distance to identify parts of the second image that are approximately the same distance away from the second camera. That is, the stereo imaging system identifies, based on the second set of estimated distances, a subset of portions of the second image corresponding the identified estimated distance.

The stereo imaging system identify, within the subset, a second cluster of pixels from the second image that matches the first cluster of pixels from the first image. For example, the selected cluster of pixels from the first image may be located at a specific estimated distance. If several clusters of pixels from the second image match the selected cluster of pixels, based on the estimated distances, the stereo imaging system may eliminate the matching clusters of pixels from that second image with estimated distances that do not match the selected cluster of pixels from the first image.

In some implementations, the stereo imaging system identifies a subset of portions of the second image corresponding the identified estimated distance by iterating over collected estimated distances to find matches. That is, the stereo imaging system may retrieve the estimated distance corresponding to the first cluster of pixels, compare the estimated distance corresponding to the first cluster of pixels with the estimated distances in the second set of estimated distances, and identify one or more estimated distances in the second set of estimated distances that match the estimated distance corresponding to the first cluster of pixels.

In some implementations, the stereo imaging system calculates, based on a location of the first cluster of pixels in the first image and a location of the second cluster of pixels in the second image, a distance to a surface represented by the first cluster and the second cluster. For example, the stereo imaging system may use a disparity value between the two pixel clusters together with focal length, baseline, and pixel size to calculate the distance to surface (i.e., depth of the object).

In some implementations, the stereo imaging system stores the identified pixel clusters and their estimated distances in a data structure. That is, the stereo imaging system stores, in a data structure, the distance and an identifier associated with the cluster of pixels from the first image, where the data structure maps distances to portions of a particular image. In some implementations, the stereo imaging system stores depth and/or distance maps. That is, the stereo imaging system identifies a set of clusters of pixels within the first image, store, in the data structure, a set of distances and corresponding identifiers associated with the set of distances, and generates a depth map based on data in the data structure.

In some implementations, the stereo imaging system uses only on ToF sensor and calculates the distance to each object from the point of view of each of the cameras using known algebraic and geometric techniques.

The details of one or more implementations are set forth in the accompanying drawings and the description below. Other features and advantages will be apparent from the description, the accompanying drawings, and the claims.

BRIEF DESCRIPTION OF DRAWINGS

FIG. 2 is a block diagram that illustrates employing ToF sensing to match clusters of pixels in a first image with clusters of pixels in a second image.

DETAILED DESCRIPTION

Figure 1:
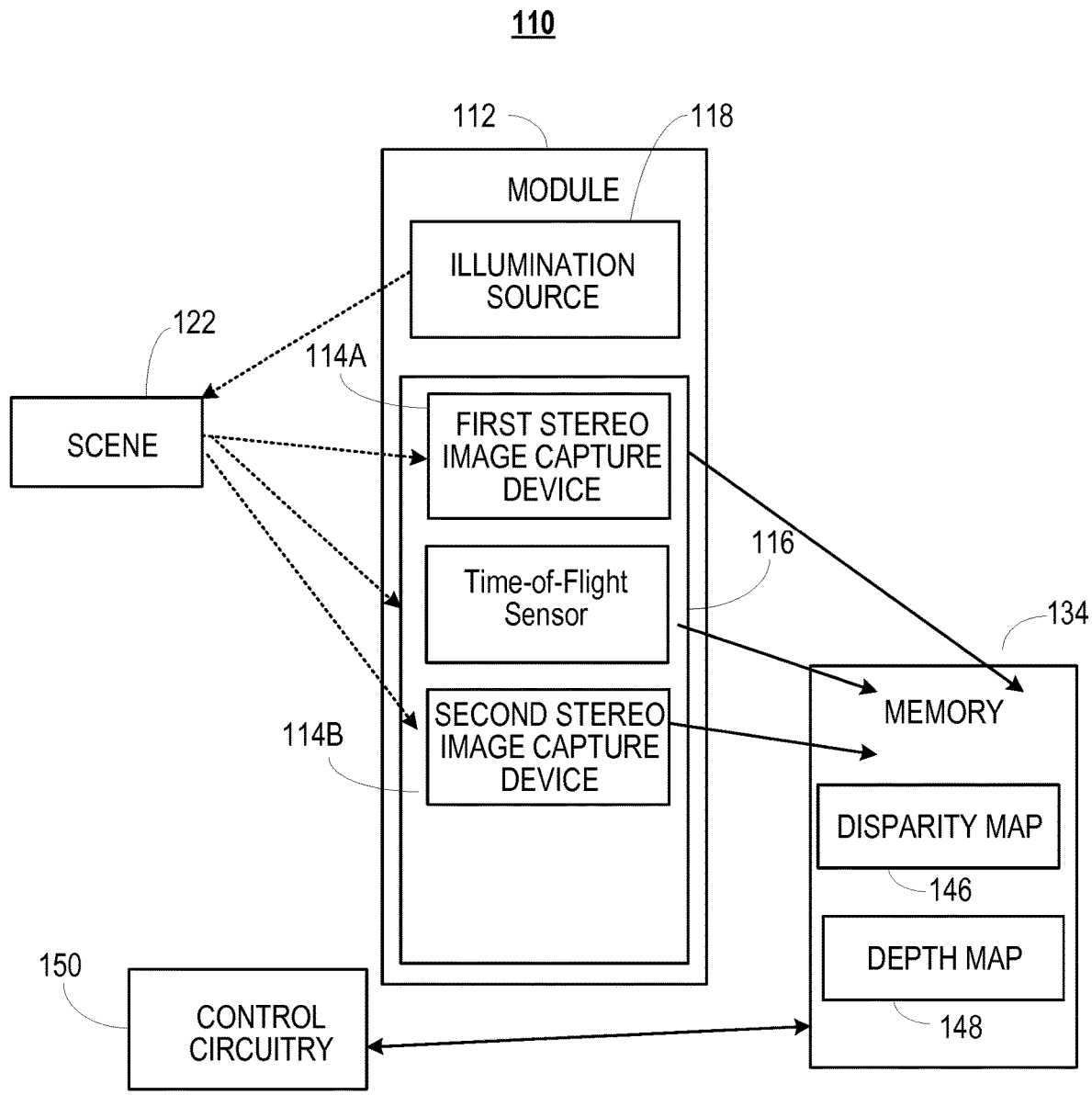
FIG. 1 is an example of a stereo imaging system 100 that employs ToF sensing to match clusters of pixels in a first image with clusters of pixels in a second image.

As shown in FIG. 1, an apparatus 110 includes an opto-electronic module 112 that includes two image capture device (e.g., lens/sensor combinations) 114A, 114B, and a Time-of-Flight ("ToF") sensor 116. The apparatus 110 is arranged to identify corresponding pixel clusters in images from the two stereo image capture devices. This identification can be used to generate a disparity map, and in some implementations a depth map, based on images of a scene 122 captured by the cameras 114A, 114B with ToF sensors 116 using distance measurements to supplement the generation processes. In some implementations, apparatus 110 may display the disparity map, for example, on the display device. Different depths (or ranges of depth) represented by the disparity map can be displayed on the screen of the computing device, for example, as different colors or using other visual indicators.

In general, the cameras 114A, 114B are arranged to capture stereo image data of the scene 122 (from slightly different vantage points), and the ToF sensor 116 to be used in calculating estimated distance data from scene 122. The cameras 114A and 114B can be implemented, for example, as CMOS or CCD image sensors.

In some implementations, module 110 also may include an associated illumination source 118 arranged to project a pattern of illumination onto the scene 122. When present, the illumination source 118 can include, for example, an infra-red (IR) projector operable to project a pattern (e.g., of dots or lines) onto objects in the scene 122. The illumination source 118 can be implemented, for example, as a light emitting diode (LED), an infra-red (IR) LED, an organic LED (OLED), an infra-red (IR) laser or a vertical cavity surface emitting laser (VCSEL).

Apparatus 110 may also include memory 134, which can store the images acquired by the cameras 114A, 114B, and data acquired by ToF sensor 116. For example, as illustrated in FIG. 1, the memory 134 can store a disparity map 146 and/or a depth map 148. In some implementations a disparity map and a depth map may be combined and stored in the memory 134.

The apparatus 110 further may include control circuitry 150 which can include one or more processors (e.g., an application specific integrated circuit (ASIC) or a field programmable gate array (FPGA)). FIG. 1 illustrates memory 134 and control circuitry 150 as being separate from the module 112, however, in some implementations they may be integrated as part of the module 112. For example, those components may be implemented as one or more integrated circuit chips mounted on a printed circuit board (PCB) within the module 112, along with the image capture devices 114A, 114B, and ToF sensor 116. In some implementations, the illumination source 118 (if present) may be separate from the module 112 that houses the image capture devices 114A, 114B, and Tof sensor 116. Further, module 112 may also include other processing and control circuitry. Such circuitry also can be implemented, for example, in one or more integrated circuit chips mounted on the same PCB as the image capture devices.

FIG. 2 is a block diagram that illustrates actions for matching a cluster of pixels of a surface in a first image to a cluster of pixels of the same surface in the second image. In block 202, control circuitry (e.g., control circuitry 150) determines, using the echoes of signals from the ToF sensor, a plurality of estimated distances for a plurality of portions of the scene. The control circuitry may retrieve ToF data from memory 134. ToF data may have been stored in memory 134 by ToF sensor 116.

As discussed above, a ToF system may be used for determining estimated distances. Generally ToF systems calculate distances to objects in a scene (e.g., scene 122). A scene is illuminated from an illumination source (e.g., illumination source 118). For instance, illumination source 118 can be infrared (IR) light, a laser or another suitable illumination source. Some of the light is reflected by an object in the scene. The reflected light is detected by the ToF sensors (e.g., ToF sensor 116).

Each pixel of the ToF sensor is capable of receiving a light signal. The control circuitry is configured to regulate the timing of the illumination. The distance information from the pixels, in combination with a 2-D image of the environment obtained by the ToF sensor, are stored in histogram memory. The data from the memory (e.g., memory 134) is used to calculate distance to an object in scene 122.

The distance information R for each pixel can be calculated, for example, as:

$$R=(c?ToF)/2,$$

where c is the speed of light and ToF is the time of flight, which is the elapsed time between emission of light from the illumination source (e.g., illumination source 118) and detection of the reflected light by the ToF sensor (e.g., ToF sensor 116).

In some examples, each demodulation pixel of the ToF sensor is capable of demodulating the received light signal. The control circuitry is configured to regulate the timing of the ToF sensor. The phase values of all pixels of the ToF sensor correspond to distance information R for a corresponding point in the scene 122. The distance information from the pixels, in combination with a 2-D image of the environment obtained by the ToF sensor, are stored in memory (e.g., memory 134). The data from the memory (e.g., memory 134) is used to calculate distance to an object in scene 122.

The demodulation of the reflected light can deliver the phase delay (P) between the emitted light and the reflected light. The phase delay corresponds to the distance R as follows:

$$R=(P?c)/(4?f\_mod),$$

where fmod is the modulation frequency of the illumination light, which can range from, e.g., a few MHz up to several GHz.

To continue with the actions of FIG. 2, in block 204, control circuitry (e.g., control circuitry 150) selects a first cluster of pixels from the first image. For example, the control circuitry may store in memory (e.g., memory 134) multiple pixel clusters detected in a first image (e.g., left image and/or right image). Those pixel clusters may be identified using edge detection algorithms or other suitable algorithms.

Figure 5:
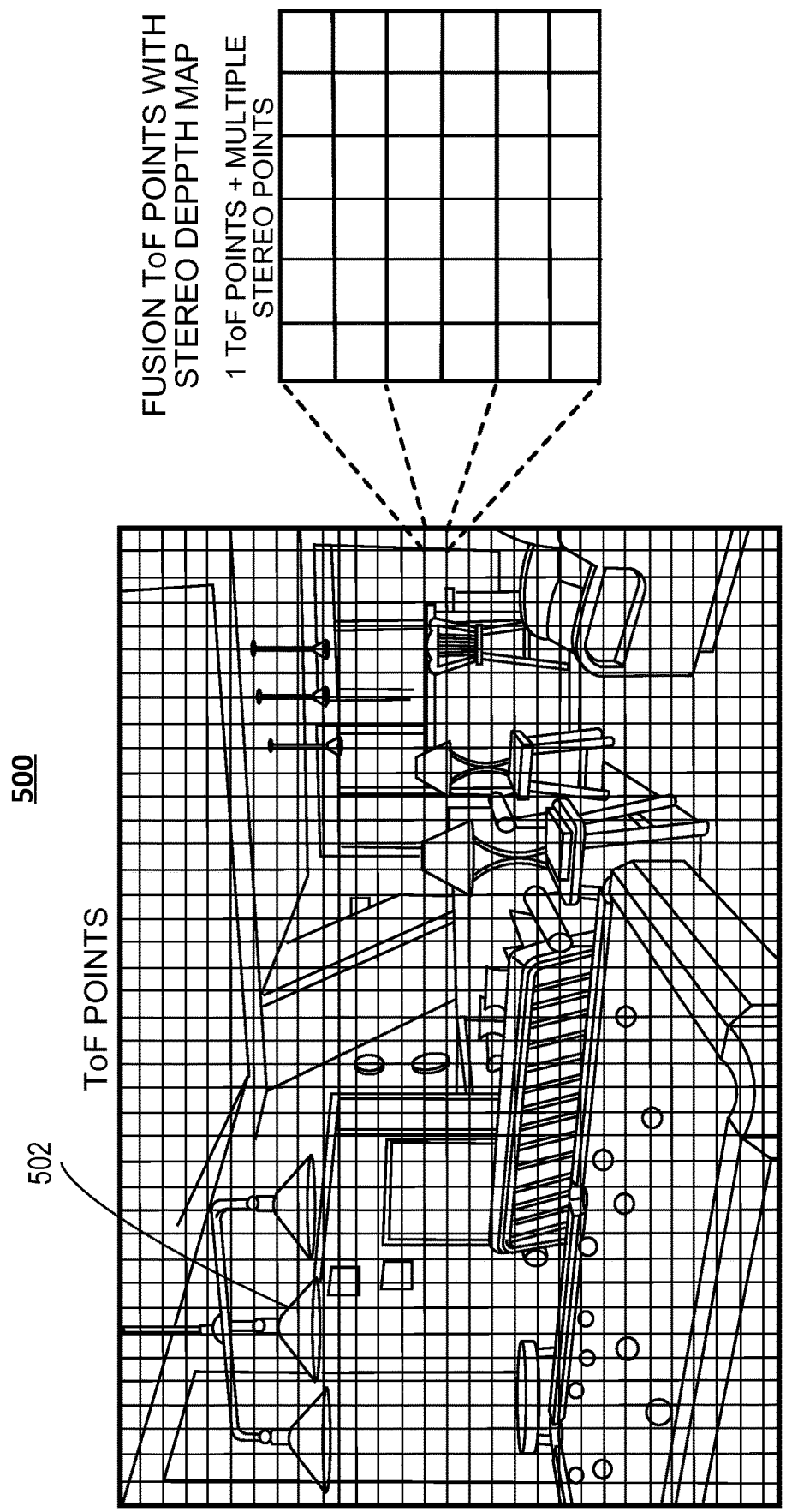
FIG. 5 illustrates an image divided into portions corresponding to ToF points mapped to pixels of an image.

In block 206, control circuitry (e.g., control circuitry 150) identifies, an estimated distance corresponding to the first cluster of pixels. For example, the control circuitry may store information about the location within the first image of the first cluster of pixels. FIG. 5 illustrates an image where each ToF point (represented by a square) corresponds to multiple pixels of an image (e.g., the first image) and is mapped to those pixels (or in some implementations stereo points). In these instances, ToF sensors are of a smaller resolution than image capture device sensors. Therefore, as illustrated in FIG. 5, control circuitry may create a map that maps points of a ToF sensor to corresponding stereo image capture device sensor points. In the example of FIG. 5, each ToF sensor point corresponds to thirty-six points of a stereo image capture device sensor.

In block 208, the control circuitry (e.g., control circuitry 150) calculates, based on the estimated distance corresponding to the first cluster of pixels, a shift distance between the first cluster of pixels in the first image and a corresponding cluster of pixels in the second image. For example, the control circuitry may retrieve a focal length of the first lens, and a distance between a center of the first lens and a center of the second lens and calculate the shift distance based on the focal length of the first lens, the distance between the center of the first lens and the center of the second lens, and the estimated distance.

The shift distance may be calculated based on the following formula.

$$D=(b*f)/z$$

where D is the shift distance, b is the distance between the centers of the first lens and the second lens and z is estimated distance to the object represented by the cluster of pixels.

In block 210, the control circuitry (e.g., control circuitry 150) locates, within the second image, the corresponding cluster of pixels based on the shift distance. For example, the control circuitry may retrieve a size associated with the first cluster of pixels. If the cluster of pixels is a regular shape (e.g., a square), the control circuitry records the coordinates within the first image corresponding to the shape. However, in many cases, the cluster of pixels will be an irregular shape. In those instances, the control circuitry may store a size of a regular shape that encompasses the irregular cluster of pixels (e.g., a square, rectangle, or a circle into which the cluster of pixels can fit).

The control circuitry then generates, for the second image, a search area based on the size of the first cluster of pixels and the shift distance and identify, in the second image, a second cluster of pixels corresponding to the first cluster of pixels. For example, the control circuitry may select, in the second image, coordinates corresponding to the generated area, but shifted by the shift distance. In some implementations, the area may be larger than the generated area (e.g., two, three or four times the generated area).

In some implementations, the control circuitry receives, from the ToF sensor, data corresponding to a plurality of echoes resulting from one or more light emissions from the light source, where the light emissions are reflected by one or more objects within the scene and location data of the plurality of echoes, and determines based on the data, the estimated distances and a location of each estimated distance. For example, the control circuitry may process the ToF data and translate the signals into estimated distances and ToF points relative to the coordinates of the scene.

Figure 3:
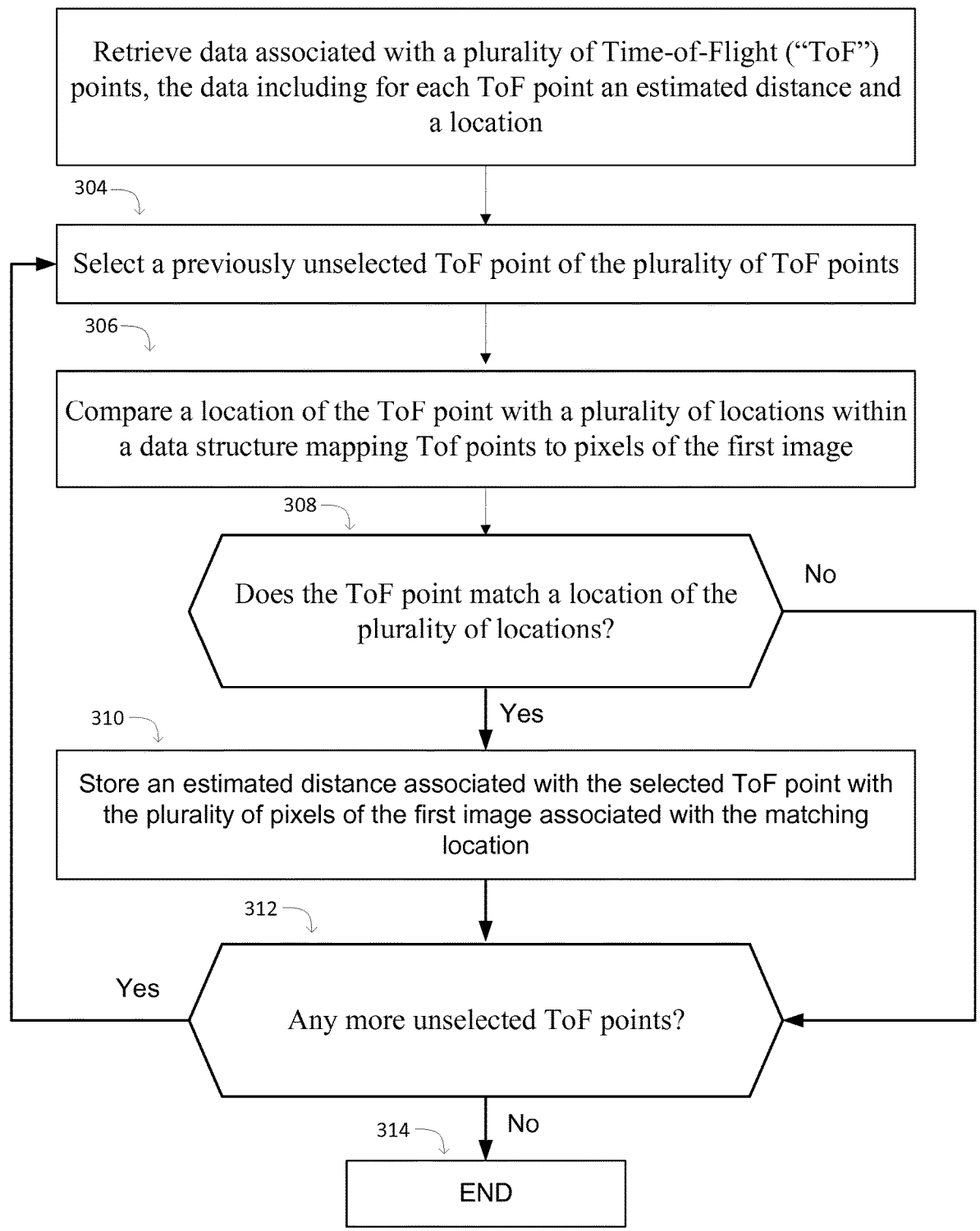
FIG. 3 is a block diagram that illustrates actions for mapping ToF points to pixels in an image.

In some implementations, the control circuitry maps the plurality of estimated distances to coordinates within the first image; and stores, in the memory (e.g., memory 134), a data structure including the plurality of estimated distances with corresponding coordinates. FIG. 3 illustrates a mapping process for ToF points to a set of pixels. In block 302, control circuitry (e.g., control circuitry 150) retrieves data associated with a plurality of Time-of-Flight ("ToF") points, the data including for each ToF point an estimated distance and a location. For example, the control circuitry may retrieve the data from memory 134. At 304, the control circuitry (e.g., control circuitry 150 selects a previously unselected ToF point of the plurality of ToF points. For example, the control circuitry may iterate over each ToF point and select previously unselected ToF points for processing.

In block 306, the control circuitry (e.g., control circuitry 150) compares a location of the ToF point with a plurality of locations within a data structure mapping Tof points to pixels of the first image. For example, the control circuitry may iterate through a data structure that list all ToF points and corresponding pixels of a first image (or any image with the resolution that is the same as the resolution of the first imaging sensor and/or the second imaging sensor). In block 308, the control circuitry (e.g., control circuitry 150) determines if the selected ToF point matches a location from the data structure. For example, the control circuitry may identify a matching location. If the control circuitry determines that there is no matching location, process 300 moves to 312. However, if the control circuitry determines that the ToF point matches a location, process 300 moves to block 310.

In block 310, the control circuitry (e.g., control circuitry 150) stores an estimated distance associated with the selected ToF point with the plurality of pixels of the first image associated with the matching location. For example, the control circuitry may generate a data structure for the first image, where every pixel can be associated with a ToF point and store the estimated distance associated with the selected ToF point with the corresponding pixel identifiers for the matching pixels.

In block 312, the control circuitry (e.g., control circuitry 150) determines whether there are more unselected ToF points. If the control circuitry determines that there more unselected ToF points, process 300 moves to block 304, where another previously unselected ToF point is selected. If the control circuitry determines that there are no more unselected ToF points, process 300 moves to 312 and ends.

In some implementations, the control circuitry identifies, in the plurality of estimated distances, the estimated distance corresponding to the first cluster of pixels by retrieving a set of coordinates within the first image, the set of coordinates corresponding to the first cluster of pixels, and identifying, in a data structure, a distance corresponding to the set of coordinates. For example, the control circuitry may retrieve horizontal coordinate and vertical coordinate of a pixel within the first cluster of pixels. The control circuitry may iterate through the data structure to find a ToF point associated with the coordinate and then the estimated distance associated with the ToF point. In some implementations, the control circuitry generates a depth map based on the data in the data structure.

Figure 6:
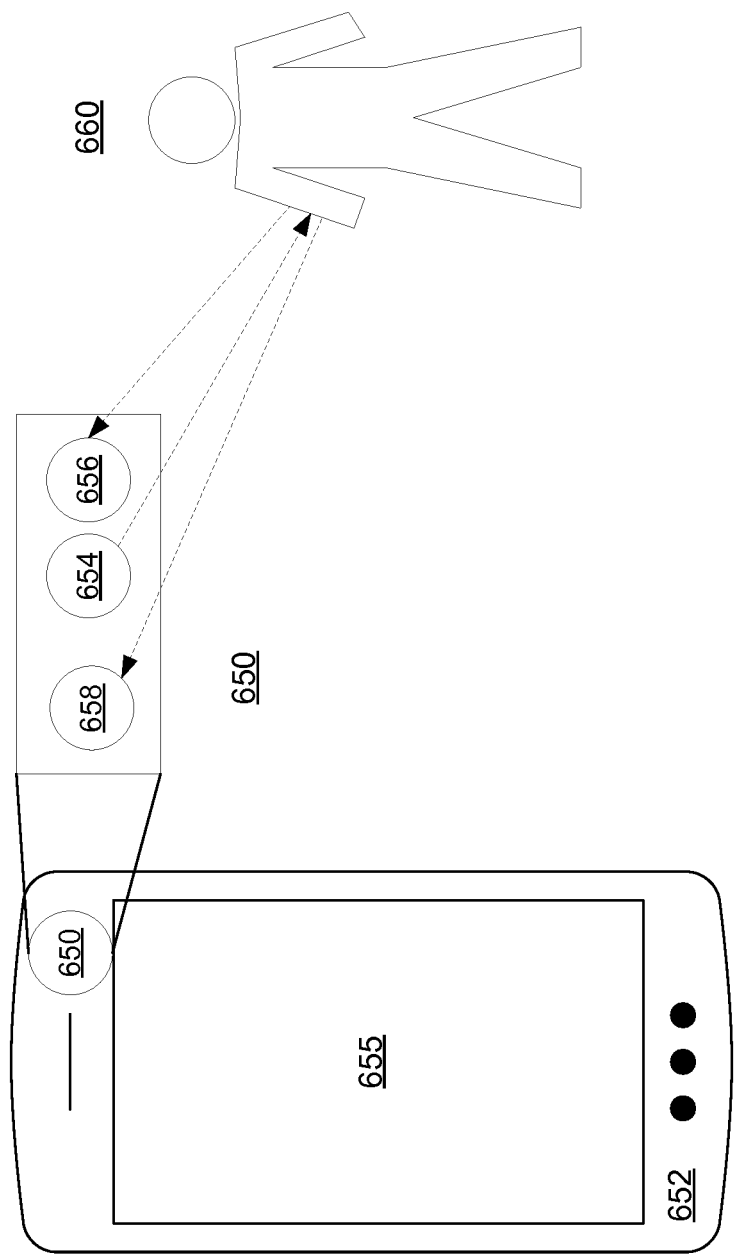
FIG. 6 illustrates an electronic device that may include a front-mounted stereo imaging system.

Referring to FIG. 6, in some examples, a stereo imaging system 650 employing ToF sensor and cameras such as those described in relation to FIG. 1 can be mounted on or incorporated into a front side of a mobile computing device 652, such as a mobile phone, a smartphone, a tablet, or a wearable computing device. The front side of the mobile device 652 is the side of the device that includes a screen 655. The depth map and/or disparity map described above can be displayed on screen 655. Stereo imaging system 650 may be a front-side imaging system that includes an illumination device 654 (which may include illumination source 118 and ToF sensor 116) and imaging components including a camera 656 and camera 658. The stereo imaging system 650 may be used to capture an image of scene 660 including a person against a white wall. The front side distance measuring system 650 may be used for various applications which need to have an accurate disparity map or depth map (e.g., photography, virtual reality, augmented reality, and other suitable applications).

Figure 7:
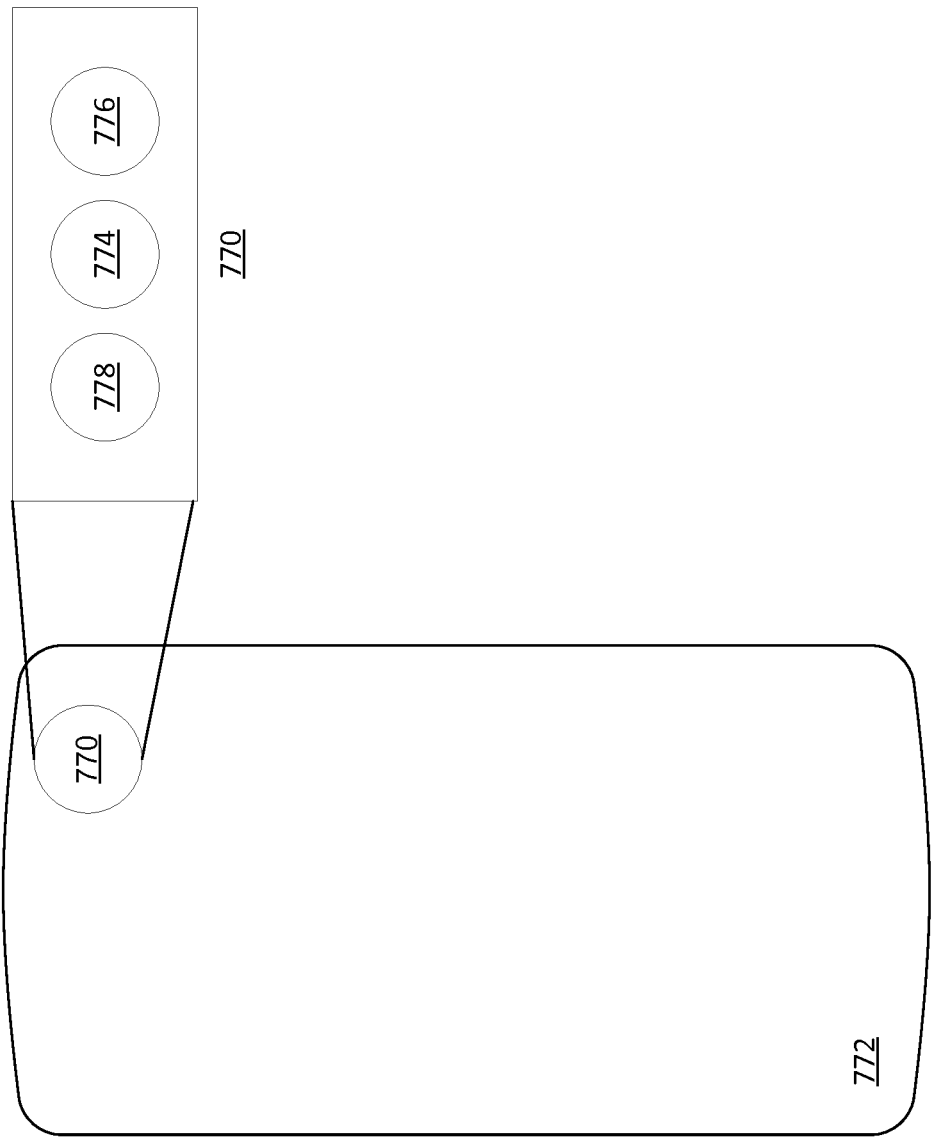
FIG. 7 illustrates an electronic device that may include a back-mounted stereo imaging system.

As shown in FIG. 7, in some examples, a stereo imaging system 770 employing ToF sensors such as those described in relation to FIG. 1 may be mounted on a back side of a mobile computing device 772. The back side is the side of the device opposite the front side (e.g., the side that does not include a display screen). The stereo imaging system 770 may be a back-side imaging system that includes an illumination device 774 (which may include illumination source 118 and ToF sensor 116) and imaging components including a camera 776 and camera 778. The back-side stereo imaging system may be used for various applications which need to have an accurate disparity map or depth map (e.g., photography, virtual reality, augmented reality, and other suitable applications).

Figure 8:
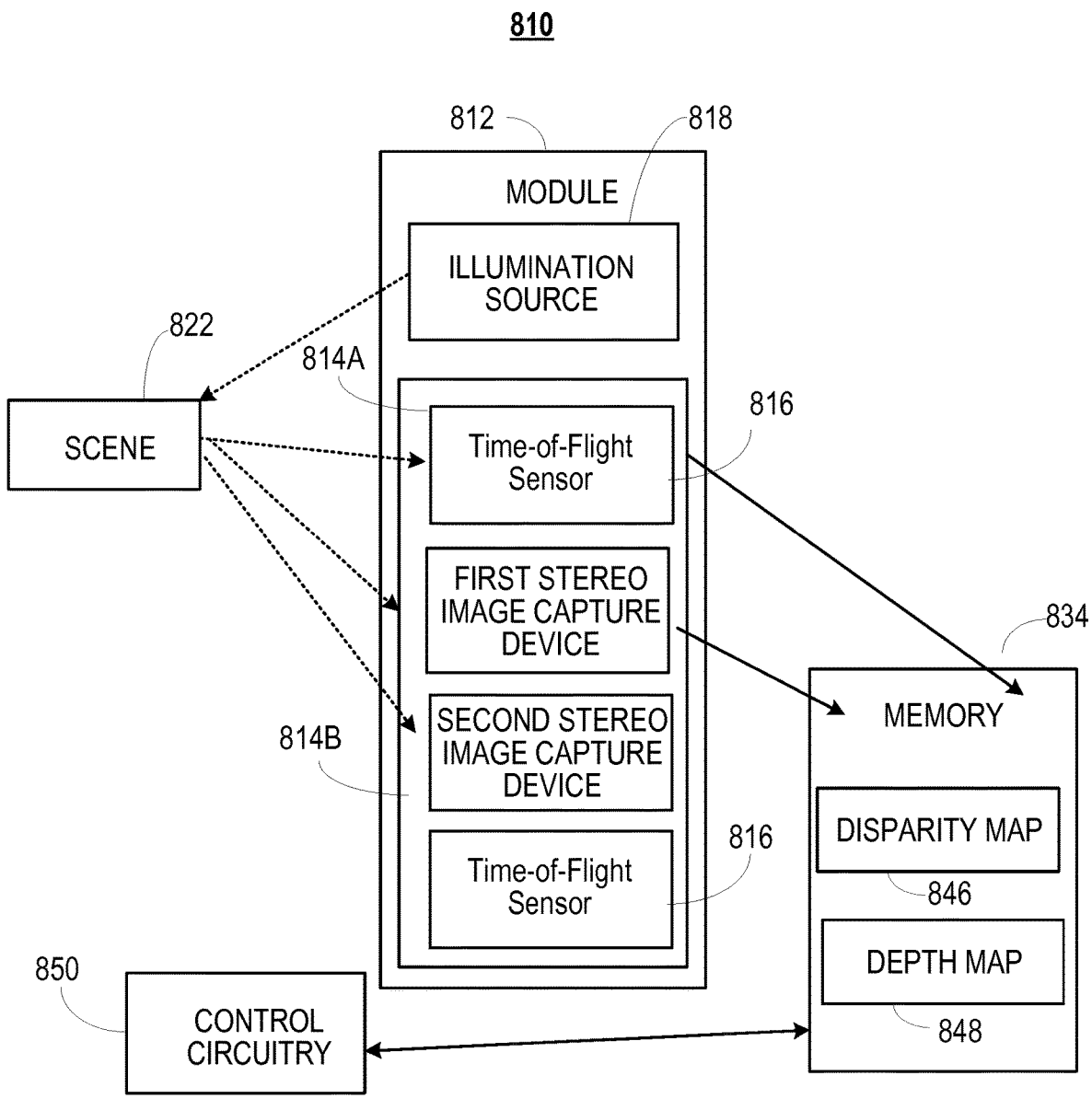
FIG. 8 is another example of a stereo imaging system 100 that employs ToF sensing to match clusters of pixels in a first image with clusters of pixels in a second image.

As shown in FIG. 8, an apparatus 810 includes an optoelectronic module 812 that includes two (or more) depth channels, each of which has a respective image capture device (e.g., camera) 814A, 814B, and a Time-of-Flight ("ToF") sensors 816. The apparatus 810 is arranged to generate a disparity map, and in some implementations a depth map, based on images of a scene 822 captured by the cameras 814A, 814B with ToF sensors 816 using distance measurements to supplement the generation processes. In some implementations, apparatus 810 may display the disparity map, for example, on the display device. Different depths (or ranges of depth) represented by the disparity map can be displayed on the screen of the computing device, for example, as different colors or using other visual indicators.

In general, the cameras 814A, 814B are arranged to capture stereo image data of the scene 822 (from slightly different vantage points), and the ToF sensors 816 are arranged to capture respective estimated distance data from scene 822. The cameras 814A and 814B can be implemented, for example, as CMOS or CCD image sensors.

In some implementations, the module 810 also may include an associated illumination source 818 arranged to project a pattern of illumination onto the scene 822. When present, the illumination source 818 can include, for example, an infra-red (IR) projector operable to project a pattern (e.g., of dots or lines) onto objects in the scene 822. The illumination source 818 can be implemented, for example, as a light emitting diode (LED), an infra-red (IR) LED, an organic LED (OLED), an infra-red (IR) laser or a vertical cavity surface emitting laser (VCSEL).

Apparatus 810 may also include memory 834, which can store the images acquired by the cameras 814A, 814B, and data acquired by ToF sensors 816. For example, as illustrated in FIG. 8, the memory 834 can store a disparity map 846 and/or a depth map 148. In some implementations a disparity map and a depth map may be combined and stored in the memory 834.

The apparatus 810 further may include control circuitry 850 which can include one or more processors (e.g., an application specific integrated circuit (ASIC) or a field programmable gate array (FPGA)). FIG. 8 illustrates memory 834 and control circuitry 150 as being separate from the module 812, however, in some implementations they may be integrated as part of the module 812. For example, those components may be implemented as one or more integrated circuit chips mounted on a printed circuit board (PCB) within the module 812, along with the image capture devices 814A, 814B, and ToF sensors 816. In some implementations, the illumination source 818 (if present) may be separate from the module 812 that houses the image capture devices 814A, 814B, and Tof sensors 816. Further, module 812 may also include other processing and control circuitry. Such circuitry also can be implemented, for example, in one or more integrated circuit chips mounted on the same PCB as the image capture devices.

Figure 9:
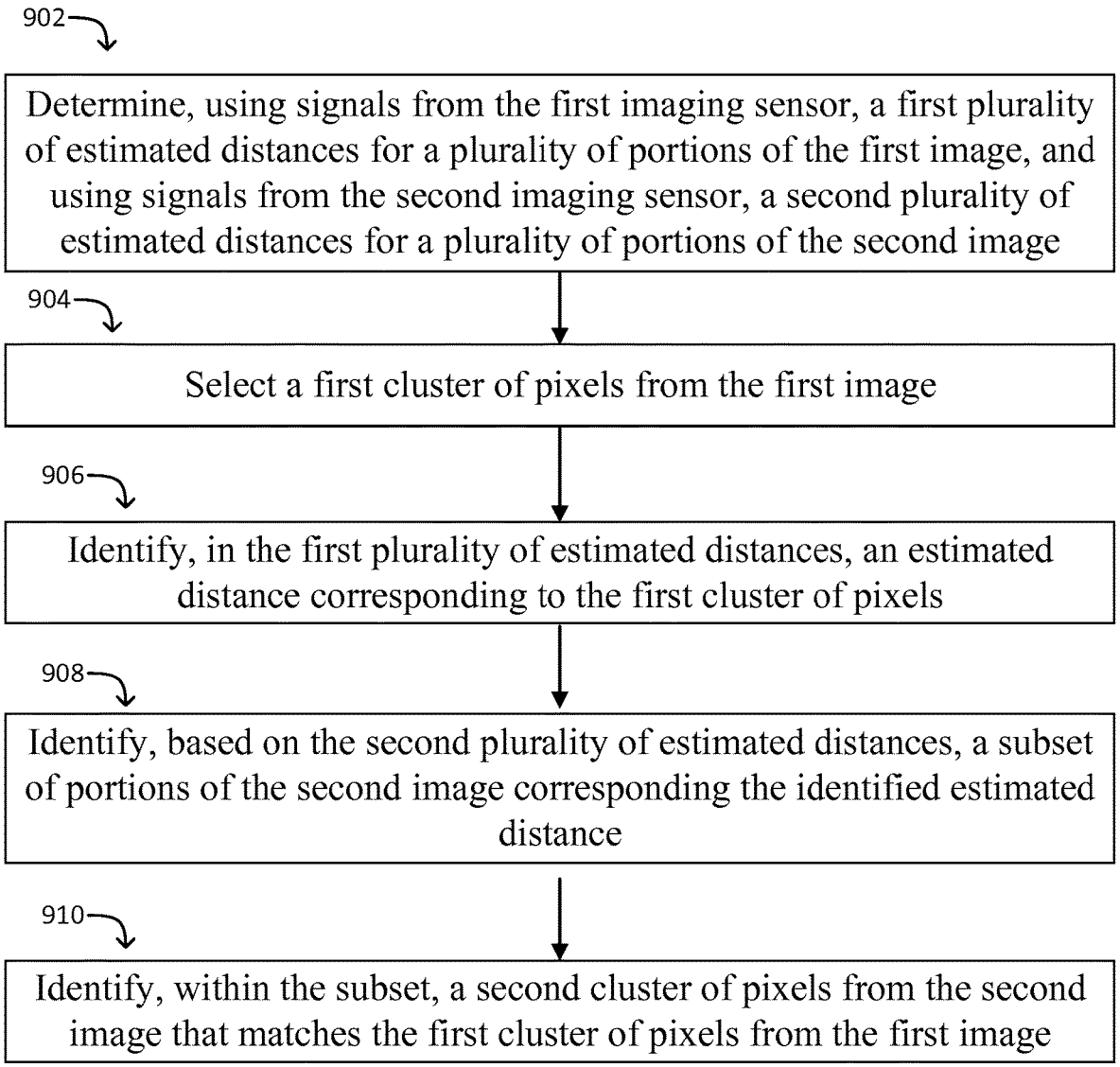
FIG. 9 is block diagram that employs ToF sensing to match clusters of pixels in a first image with clusters of pixels in a second image.

As described in this application control circuitry may be configured to perform action described in this disclosure. FIG. 9 is a block diagram that illustrates actions for matching a cluster of pixels of a surface in a first image with a cluster of pixels of the same surface in the second. In block 902, control circuitry (e.g., control circuity 150 or control circuitry 850) determines, using signals from the first ToF sensor (e.g., ToF sensor 816 coupled to a first stereo image capture device as shown in FIG. 8), a first set of estimated distances for portions of the first image, and using signals from the second ToF sensor (e.g., ToF sensor 816 coupled with a second stereo image capture device as shown in FIG. 8), a second set of estimated distances for portions of the second image. In some embodiments, as described in FIG. 1, only one ToF sensor may be utilized, and be calibrated to work with both the first camera and the second camera.

In some implementations, the first stereo image capture device and the second stereo image capture device are calibrated to be at the same height and are actuated simultaneously to capture the first image, the second image, and the ToF images. If the stereo image capture devices are not at the same height, the images may be rectified to adjust for the difference.

To continue with the actions of FIG. 9, in block 904, control circuitry (e.g., control circuitry 150) selects a first cluster of pixels from the first image. For example, the control circuitry may store in memory (e.g., memory 134 or memory 834) multiple pixel clusters detected in a first image (e.g., left image and/or right image). Those pixel clusters may be identified using edge detection algorithms or other suitable algorithms.

In block 906, control circuitry (e.g., control circuitry 150 or control circuitry 850) identifies, in the first set of estimated distances, an estimated distance corresponding to the first cluster of pixels. For example, the control circuitry may store information about the location within the first image of the first cluster of pixels. FIG. 5 illustrates an image divided into portions corresponding to the pixels of a ToF sensor and mapped to points associated with a stereo image capture device (e.g., first stereo capture device or second stereo capture device of FIG. 1 or FIG. 8). In some instances, ToF sensors are of a smaller resolution than image capture device sensors. Therefore, as illustrated in FIG. 5, control circuitry may create a map that maps points of a ToF sensor to corresponding stereo image capture device sensor points. In the example of FIG. 5, each ToF sensor point corresponds to thirty-six points of a stereo image capture device sensor.

In block 908, control circuitry (e.g., control circuitry 150 or control circuitry 850) identifies, based on the second set of estimated distances, a subset of portions of the second image corresponding the identified estimated distance. In some implementations the control circuitry iterates through each portion of the second image as captured by a ToF sensor to identify the matching distances. As illustrated in FIG. 5, ToF points may represent specific areas of a scene and be stored in a data structure. Each entry in the data structure may include corresponding points (or pixels) within the image as captured by a stereo image capture device.

Figure 4:
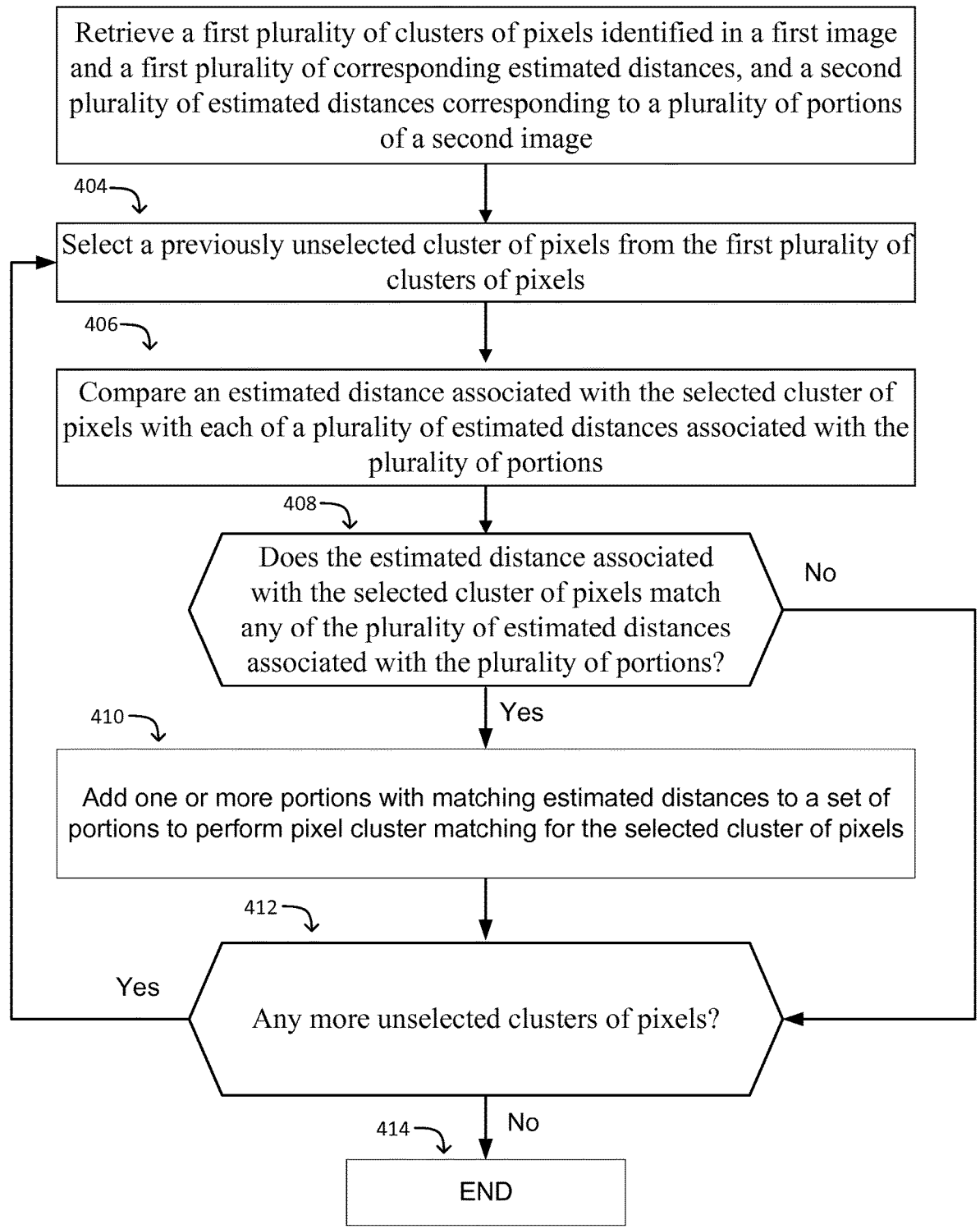
FIG. 4 is a block diagram that illustrates actions for identifying clusters of pixels in a second image with substantially similar estimated distances to the selected cluster of pixels from a first image.

FIG. 4 is a block diagram that illustrates actions for identifying clusters of pixels in a second image with substantially similar estimated distances to the selected cluster of pixels from a first image. In block 402, control circuitry (e.g., control circuitry 150 or control circuitry 850) retrieves a first set of clusters of pixels identified in a first image and a first set of corresponding estimated distances, and a second set of estimated distances corresponding to portions of a second image. For example, as discussed above, an identifier may be stored in a data structure for each cluster of pixels. Together with the identifier an estimated distance for the cluster of pixels may be stored. That estimated distance may have been derived from mapping the cluster of pixels onto one or more points of a ToF sensor. For example, light 502 may be associated with two or more ToF points which in turn are associated with 36 or more points of a stereo image capture device. The control circuitry may retrieve that information.

In block 404, the control circuitry (e.g., control circuitry 150 or control circuitry 850) selects a previously unselected cluster of pixels from the first set of clusters of pixels. For example, the control circuitry may iterate through each cluster of pixels of the first image to match a cluster of pixels in the second image.

In block 406, the control circuitry (e.g., control circuitry 150 or control circuitry 850) compares an estimated distance associated with the selected cluster of pixels with each of a set of estimated distances associated with the portions. For example, the control circuitry may execute a loop comparing the estimated distance of the selected cluster of pixels to distances associated with the set of clusters of pixels from the second image.

In block 408, the control circuitry (e.g., control circuitry 150 or control circuitry 850) determines whether the estimated distance associated with the selected cluster of pixels matches any of the set of estimated distances associated with the portions. If no estimated distances match, the control circuitry determines that the cluster of pixels either does not exist or an error has occurred in the process. At that point, process 400 moves to block 412 and continues. In some implementations, the clusters of pixels that did not match may be stored in memory, and other techniques may be used to determine whether the cluster of pixels can be matched or does not exist in the second image of the pair.

If the estimated distance associated with the selected cluster of pixels matches one or more of the set of estimated distances associated with the portions, process 400 moves to block 410. That is, if the distance associated with the cluster of pixels matches at least one distance in the second image, process 400 continues. In block 410, the control circuitry (e.g., control circuitry 150 or control circuitry 850) adds one or more portions with matching estimated distances to a set of portions to perform pixel cluster matching for the selected cluster of pixels. For example, ToF points for the matching distances may be stored in memory (e.g., memory 134 or memory 834).

In block 412, the control circuitry (e.g., control circuitry 150) determines whether all pixel cluster have been previously selected (i.e., iterated through). If all pixels previously have been selected, process 400 ends in block 414. If more unselected clusters of pixels exist, process 400 moves to block 404 where another previously unselected cluster of pixels is selected for processing.

To continue with FIG. 9, in block 910, the control circuitry (e.g., control circuitry 150) identifies, within the subset, a second cluster of pixels from the second image that matches the first cluster of pixels from the first image. The control circuitry may use known techniques (e.g., image matching or pixel matching) to identify the matching cluster of pixels in the second image.

In some implementations when determining the first set of estimated distances, the control circuitry divides the first image into portions. For example, as illustrated in FIG. 5, the first image may be divided into portions that are associated with a corresponding ToF point. The control circuitry receives, with the first ToF sensor, a first set of echoes resulting from one or more light emissions from the light source, where the light emissions are reflected by one or more objects within the portions of the first image. Based on the echoes, the control circuitry may build a histogram of each pixel/ToF point and determine, based on the set of echoes, the first set of estimated distances for the portions of the first image. For example, light collected by each pixel of the ToF sensor can be converted into an estimated distance and stored in memory (e.g., memory 134) creating the first set of estimated distances.

In some implementations, the control circuitry calculates, based on a location of the first cluster of pixels in the first image and a location of the second cluster of pixels in the second image, a distance to a surface represented by the first cluster and the second cluster. The control circuitry may use known techniques to perform the calculation.

In some implementations, the control circuitry is further configured store, in a data structure, the distance and an identifier associated with the cluster of pixels from the first image, where the data structure maps distances to portions of a particular image. As illustrated in FIG. 5, the control circuitry may map points or pixels of the ToF sensor to points or pixels of a stereo capture device. In some implementations, the control circuitry generates a depth map based on data in the data structure.

Figure 10:
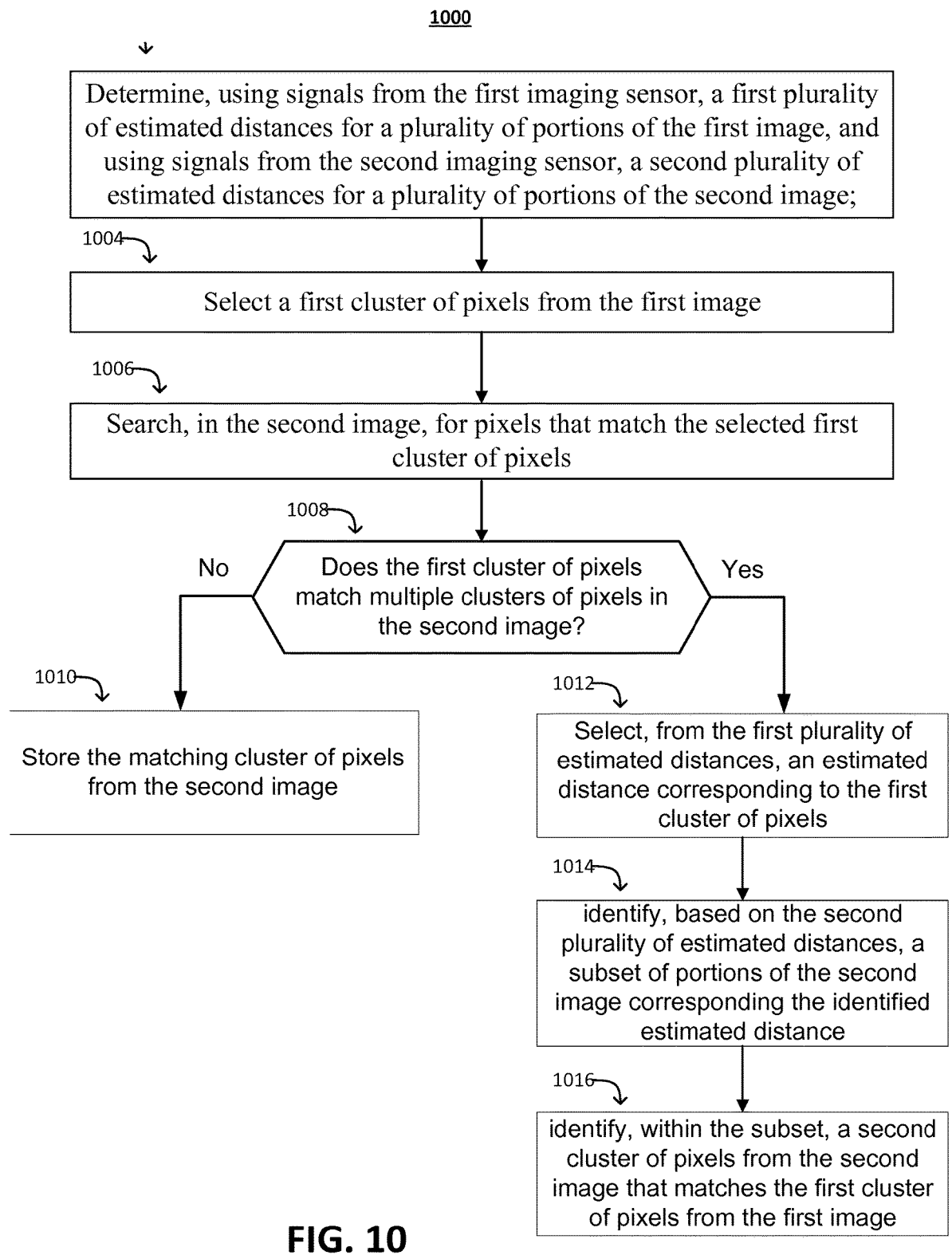
FIG. 10 is another block diagram that illustrates actions for matching a cluster of pixels of a surface in a first image to a cluster of pixels of the same surface in the second.

FIG. 10 is another block diagram that illustrates actions for matching a cluster of pixels of a surface in a first image to a cluster of pixels of the same surface in the second. This process is especially useful in instances where it would be challenging to match pixel clusters due to lack of texture in the stereoscopic pair of images. In block 1002, control circuitry (e.g., control circuitry 150 or control circuitry 850) determines, using signals from the first ToF sensor (e.g., ToF sensor 816 coupled with a first stereo image capture device as shown in FIG. 8), a first set of estimated distances for portions of the first image, and using signals from the second ToF sensor (e.g., ToF sensor 816 coupled with a second stereo image capture device as shown in FIG. 8), a second set of estimated distances for portions of the second image. In some implementations, only one ToF sensor (as illustrated in FIG. 1) may be used. The ToF sensor may be calibrated to generate ToF points for the scene.

In block 1004, the control circuitry (e.g., control circuitry 150 or control circuitry 850) selects a first cluster of pixels from the first image. For example, the control circuitry may store in memory (e.g., memory 134 or memory 834) multiple pixel clusters detected in a first image (e.g., left image and/or right image). Those pixel clusters may be identified using edge detection algorithms or other suitable algorithms.

In block 1006, the control circuitry (e.g., control circuitry 150 or control circuitry 850) searches, in the second image, for pixels that match the selected first cluster of pixels. For example, the control circuitry may use pixel matching or image matching techniques to identify matching clusters of pixels. In block 1008, the control circuitry (e.g., control circuitry 150 or control circuitry 850) determines whether the first cluster of pixels matches multiple clusters of pixels in the second image. If the control circuitry determines that the first cluster of pixels does not match multiple cluster of pixels in the second image, process 1000 moves to 1010, where the control circuitry stores (e.g., in memory 134 or memory 834) the matching cluster of pixels from the second image. At this point, process 1000 ends.

If the control circuitry determines that the first cluster of pixels matches multiple cluster of pixels in the second image, process 1000 moves to block 1012, where the control circuitry selects, from the first set of estimated distances, an estimated distance corresponding to the first cluster of pixels. For example, the control circuitry may retrieve the estimated distance from a data structure stored in memory (e.g., memory 134 or memory 834). The estimated distance may be stored in a table and may be associated in that table with the first cluster of pixels.

In block 1014, the control circuitry (e.g., control circuitry 150 or control circuitry 850) identifies, based on the second set of estimated distances, a subset of portions of the second image corresponding the identified estimated distance. For example, the control circuitry may iterate through each estimated distance (e.g., as illustrated in ToF points of FIG. 5) and identify a subset that matches the estimated distance of the selected cluster of pixels.

In block 1016, the control circuitry identifies, within the subset, a second cluster of pixels from the second image that matches the first cluster of pixels from the first image. For example, the control circuitry may compare cluster of pixels that correspond to the subset of portions of the second image to the cluster of pixels that were found based on the search and determine which of the clusters of pixels match.

In some implementations, a direct ToF system may be used in determining pluralities of estimated distances as discussed in FIG. 10. In some implementations, the control circuitry identifies a subset of portions of the second image corresponding the identified estimated distance by taking the following actions. The control circuitry retrieves the estimated distance corresponding to the first cluster of pixels. For example, the control circuitry may retrieve the first cluster of pixels (including an identifier of the first cluster of pixels and estimated distance data) from memory (e.g., memory 134 or memory 834). The control circuitry also may retrieve estimated distances of the second set of estimated distances (i.e., distances from the second image). For example, as illustrated in FIG. 5 the control circuitry may retrieve ToF points. ToF points may be distances for specific ToF pixels.

The control circuitry may compare the estimated distance corresponding to the first cluster of pixels with the estimated distances in the second set of estimated distances, and identify one or more estimated distances in the second set of estimated distances that match the estimated distance corresponding to the first cluster of pixels. For example, the control circuitry may compare distances and may determine that distances within a specific percentage (e.g., with five percent, ten percent, or another suitable percentage) are matching distances.

In some implementations, the control circuitry calculates, based on a location of the first cluster of pixels in the first image and a location of the second cluster of pixels in the second image, a distance to a surface represented by the first cluster and the second cluster. Known techniques may be used for this calculation.

In some implementations, the control circuitry stores, in a data structure, the distance and an identifier associated with the cluster of pixels from the first image in a data structure, where the data structure maps distances to portions of a particular image. The data structure may be generated based on the ToF points of FIG. 5. For example, each ToF point may be a node in the data structure with corresponding points/pixels on the captured image. Based on the map for a set of clusters of pixels in the first image with matching clusters of pixels in the second image, the control circuitry generates a depth map and/or a disparity map.

Various aspects of the subject matter and the functional operations described in this disclosure can be implemented in digital electronic circuitry, or in software, firmware, or hardware, including the structures disclosed in this specification and their structural equivalents, or in combinations of one or more of them. In addition, aspects of the subject matter described in this disclosure can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The apparatus can include, in addition to hardware, code that creates an execution environment for the computer program in question, e.g., code that constitutes processor firmware.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous.

A number of embodiments have been described. Nevertheless, it will be understood that various modifications may be made without departing from the spirit and scope of the invention. For example, some of the steps described above may be order independent, and thus can be performed in an order different from that described above.

Accordingly, other implementations are within the scope of the claims.

The invention claimed is:

1. An apparatus comprising:
a first camera coupled to a first Time-of-Flight ("ToF") sensor and operable to capture a first image;
a second camera coupled to a second ToF sensor and operable to capture a second image; and
control circuitry coupled to the first camera and the second camera, the control circuitry configured to:
determine, using signals from the first ToF sensor, a first plurality of estimated distances for a plurality of portions of the first image, and using signals from the second ToF sensor, a second plurality of estimated distances for a plurality of portions of the second image;
select a first cluster of pixels from the first image;
identify, in the first plurality of estimated distances, an estimated distance corresponding to the first cluster of pixels;
identify, based on the second plurality of estimated distances, a subset of portions of the second image corresponding the identified estimated distance; and
identify, within the subset, a second cluster of pixels from the second image that matches the first cluster of pixels from the first image.

2. The apparatus of claim 1 further comprising a light source and a memory, wherein the control circuitry is configured to determine the first plurality of estimated distances by:

dividing the first image into the plurality of portions;
receiving, with the first ToF sensor, a first plurality of echoes resulting from one or more light emissions from the light source, wherein the light emissions are reflected by one or more objects within the plurality of portions of the first image;
determining, based on the plurality of echoes, the first plurality of estimated distances for the plurality of portions of the first image; and
storing the first plurality of estimated distances in the memory.

3. The apparatus of claim 1, wherein the control circuitry is configured to identify a subset of portions of the second image corresponding the identified estimated distance by:
retrieving the estimated distance corresponding to the first cluster of pixels;
comparing the estimated distance corresponding to the first cluster of pixels with the estimated distances in the second plurality of estimated distances; and
identifying one or more estimated distances in the second plurality of estimated distances that match the estimated distance corresponding to the first cluster of pixels; and
retrieving one or more portions associated with the one or more estimated distances.

4. The apparatus of claim 1, wherein the control circuitry is further configured to calculate, based on a location of the first cluster of pixels in the first image and a location of the second cluster of pixels in the second image, a distance to a surface represented by the first cluster and the second cluster.

5. The apparatus of claim 4, wherein the control circuitry is further configured store, in a data structure, the distance and an identifier associated with the cluster of pixels from the first image, wherein the data structure maps distances to portions of a particular image.

6. The apparatus of claim 1, wherein the control circuitry is further configured to:
identify a plurality of clusters of pixels within the first image;
store, in a data structure, a plurality of distances and corresponding identifiers associated with the plurality of distances; and
generate a depth map based on data in the data structure.

7. A method comprising:
determining, using signals from a first ToF sensor, a first plurality of estimated distances for a plurality of portions of a first image captured by a first camera coupled to the first ToF sensor;
determining, using signals from a second ToF sensor, a second plurality of estimated distances for a plurality of portions of a second image captured by a second camera coupled to the second ToF sensor;
selecting a first cluster of pixels from the first image;
identifying, in the first plurality of estimated distances, an estimated distance corresponding to the first cluster of pixels;
identifying, based on the second plurality of estimated distances, a subset of portions of the second image corresponding the identified estimated distance; and
identifying, within the subset, a second cluster of pixels from the second image that matches the first cluster of pixels from the first image.

8. The method of claim 7 further comprising:
dividing the first image into the plurality of portions;
receiving, with the first ToF sensor, a first plurality of echoes resulting from one or more light emissions from a light source, wherein the light emissions are reflected by one or more objects within the plurality of portions of the first image;
determining, based on the plurality of echoes, the first plurality of estimated distances for the plurality of portions of the first image; and
storing the first plurality of estimated distances in memory.

9. The method of claim 7, wherein identifying a subset of portions of the second image corresponding the identified estimated distance comprises:
retrieving the estimated distance corresponding to the first cluster of pixels;
comparing the estimated distance corresponding to the first cluster of pixels with the estimated distances in the second plurality of estimated distances; and
identifying one or more estimated distances in the second plurality of estimated distances that match the estimated distance corresponding to the first cluster of pixels; and
retrieving one or more portions associated with the one or more estimated distances.

10. The method of claim 7, further comprising calculating, based on a location of the first cluster of pixels in the first image and a location of the second cluster of pixels in the second image, a distance to a surface represented by the first cluster and the second cluster.

11. The method claim 10, further comprising storing, in a data structure, the distance and an identifier associated with the cluster of pixels from the first image, wherein the data structure maps distances to portions of a particular image.

12. The method of claim 7, further comprising:
identifying a plurality of clusters of pixels within the first image;
storing, in a data structure, a plurality of distances and corresponding identifiers associated with the plurality of distances; and
generating a depth map based on data in the data structure.

13. An apparatus comprising:
a first lens coupled to a first imaging sensor operable to capture a first image of a scene from a first point of view;
a second lens coupled to a second imaging sensor operable to capture a second image of the scene from a second point of view;
a time-of-flight ("ToF") sensor operable to capture echoes of signals; and
control circuitry coupled to the first imaging sensor, the second imaging sensor and the ToF sensor, the control circuitry configured to:
determine, using the echoes of signals from the ToF sensor, a plurality of estimated distances for a plurality of portions of the scene;
select a first cluster of pixels from the first image;
identify, in the plurality of estimated distances, an estimated distance corresponding to the first cluster of pixels;
calculate, based on the estimated distance corresponding to the first cluster of pixels, a shift distance between the first cluster of pixels in the first image and a corresponding cluster of pixels in the second image; and
locate, within the second image, the corresponding cluster of pixels based on the shift distance.

14. The apparatus of claim 13, wherein the control circuitry is configured to determine the plurality of estimated distances by:

receiving, from the ToF sensor, data corresponding to a plurality of echoes resulting from one or more light emissions from the light source, wherein the light emissions are reflected by one or more objects within the scene and location data of the plurality of echoes;

determining based on the data, the plurality of estimated distances and a location of each estimated distance;

mapping the plurality of estimated distances to coordinates within the first image; and storing, in the memory, a data structure including the plurality of estimated distances with corresponding coordinates.

15. The apparatus of claim 14, wherein the control circuitry is configured to identify, in the plurality of estimated distances, the estimated distance corresponding to the first cluster of pixels by:

retrieving a set of coordinates within the first image, the set of coordinates corresponding to the first cluster of pixels; and identifying, in the data structure, a distance corresponding to the set of coordinates.

16. A method comprising:

determining, using the echoes of signals from a ToF sensor, a plurality of estimated distances for a plurality of portions of the scene;

selecting a first cluster of pixels from a first image captured from the first point of view by the first imaging sensor;

identifying, in the plurality of estimated distances, an estimated distance corresponding to the first cluster of pixels;

calculating, based on the estimated distance corresponding to the first cluster of pixels, a shift distance between the first cluster of pixels in the first image and a corresponding cluster of pixels in a second image that was captured from the second point of view by the second imaging sensor; and locate, within the second image, the corresponding cluster of pixels based on the shift distance.

17. The method of claim 16 wherein determining the plurality of estimated distances comprises:

receiving, from the ToF sensor, data corresponding to a plurality of echoes resulting from one or more light emissions from the light source, wherein the light emissions are reflected by one or more objects within the scene and location data of the plurality of echoes;

determining based on the data, the plurality of estimated distances and a location of each estimated distance;

mapping the plurality of estimated distances to coordinates within the first image; and storing, in the memory, a data structure including the plurality of estimated distances with corresponding coordinates.

18. The method of claim 17, wherein identifying, in the plurality of estimated distances, the estimated distance corresponding to the first cluster of pixels comprises:

retrieving a set of coordinates within the first image, the set of coordinates corresponding to the first cluster of pixels; and identifying, in the data structure, a distance corresponding to the set of coordinates.

19. The method of claim 16, wherein calculating the shift distance between the first cluster of pixels in the first image and the corresponding cluster of pixels in the second image comprises:

retrieving a focal length of the first lens, and a distance between a center of the first lens and a center of the second lens; and calculating the shift distance based on the focal length of the first lens, the distance between the center of the first lens and the center of the second lens, and the estimated distance.

20. The method of claim 16, wherein locating, within the second image, the corresponding cluster of pixels based on the shift distance comprises:

retrieving a size associated with the first cluster of pixels;

generating, for the second image, a search area based on the size of the first cluster of pixels and the shift distance; and identifying, in the second image, a second cluster of pixels corresponding to the first cluster of pixels.

* * * * *